United States Patent [19]

Henri et al.

[11] Patent Number: 4,757,317
[45] Date of Patent: Jul. 12, 1988

[54] METHOD AND A DEVICE FOR EXTENDING THE RANGE OF RADAR RECURRENCE FREQUENCIES ACCEPTABLE BY A DIGITAL IMAGE CONVERTER

[75] Inventors: Jean-Claude Henri, Boulogne Billancourt; Jean-Pierre Andrieu, Paris, both of France

[73] Assignee: Thomson-CSF, Paris, France

[21] Appl. No.: 827,588

[22] Filed: Feb. 10, 1986

[30] Foreign Application Priority Data

Feb. 15, 1985 [FR] France ................................. 85 02250

[51] Int. Cl.$^4$ .......................................... H04N 7/01
[52] U.S. Cl. ..................................... 342/185; 358/140
[58] Field of Search ................... 343/5 C, 5 D, 55 C, 343/6 TV; 358/140; 364/731; 342/73–75, 185

[56] References Cited

U.S. PATENT DOCUMENTS

| | | | |
|---|---|---|---|
| 3,408,647 | 10/1968 | Dynan et al. | 343/55 C |
| 3,961,329 | 6/1976 | Naidich | 343/55 C X |
| 4,214,269 | 7/1980 | Parker et al. | 358/140 |
| 4,387,365 | 6/1983 | Berry et al. | 358/140 X |
| 4,392,137 | 7/1983 | Intlekofer et al. | 343/55 C |

FOREIGN PATENT DOCUMENTS

| | | |
|---|---|---|
| 0099832 | 1/1984 | European Pat. Off. . |
| 2003355 | 3/1979 | United Kingdom . |
| 2047040 | 11/1980 | United Kingdom . |

Primary Examiner—Theodore M. Blum
Assistant Examiner—Bernarr Earl Gregory
Attorney, Agent, or Firm—Pollock, VandeSande & Priddy

[57] ABSTRACT

A method and a device for extending the range of radar video data (recurrences) received at the radar pulse repetition frequency (PRF) which can be accented by a digital image converter (DIC) for processing a radar-type image. The frequency of the angular increments ($\epsilon$) received for locating the angular position ($\theta$) of the radar antenna with respect to a reference direction (north) is modified in order to make the angular increment frequency more nearly a function PRF, thereby guarding against any irregularity of the radar image or any defect of remanence.

14 Claims, 4 Drawing Sheets

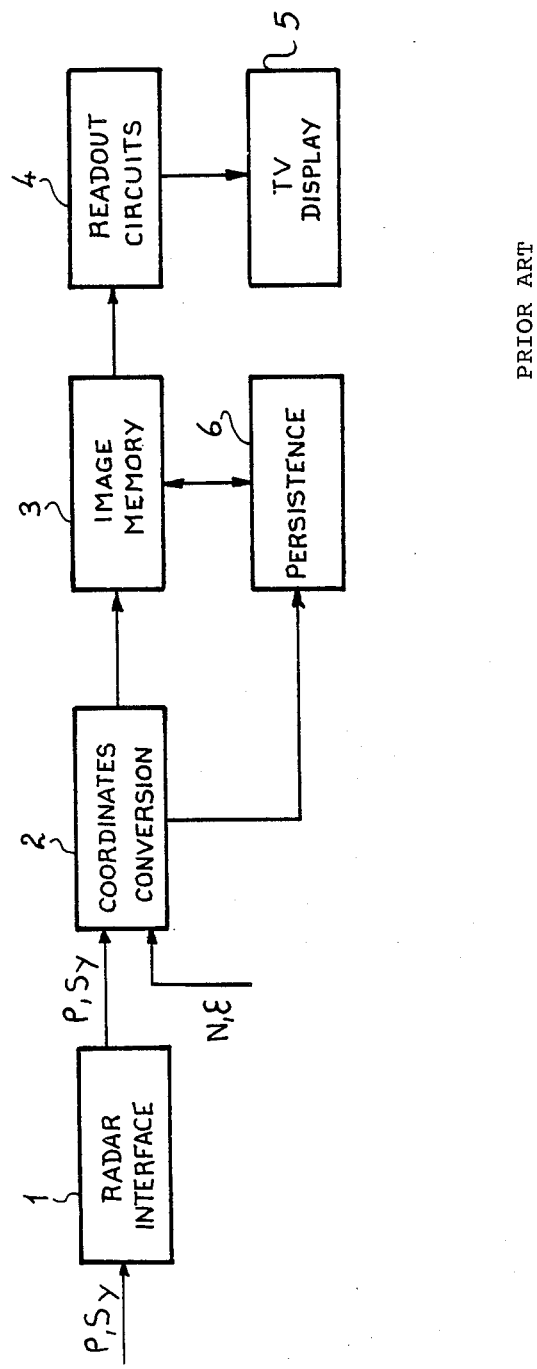

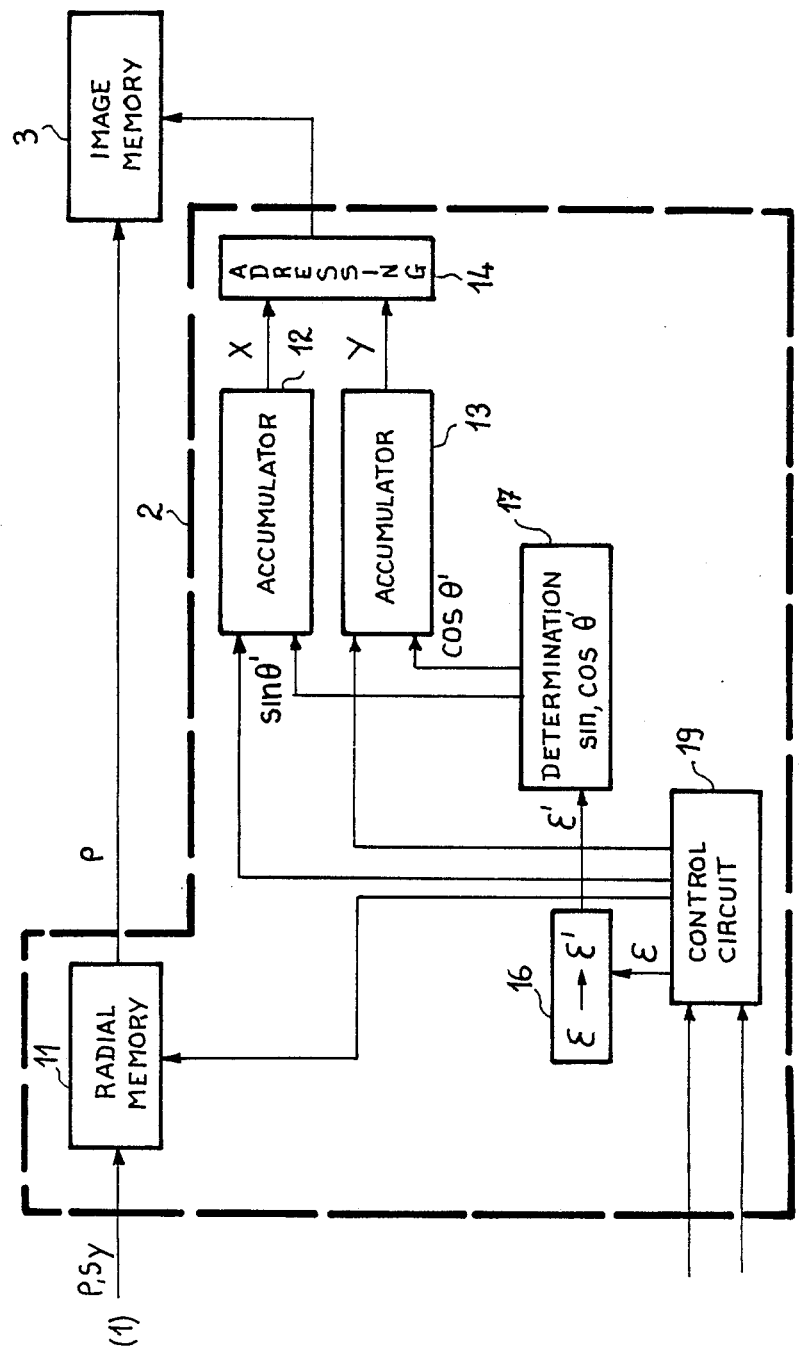
FIG_2

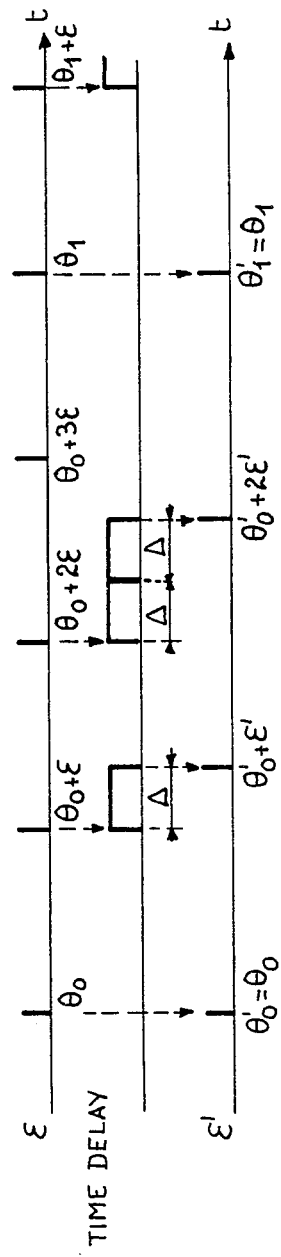
FIG_3-a
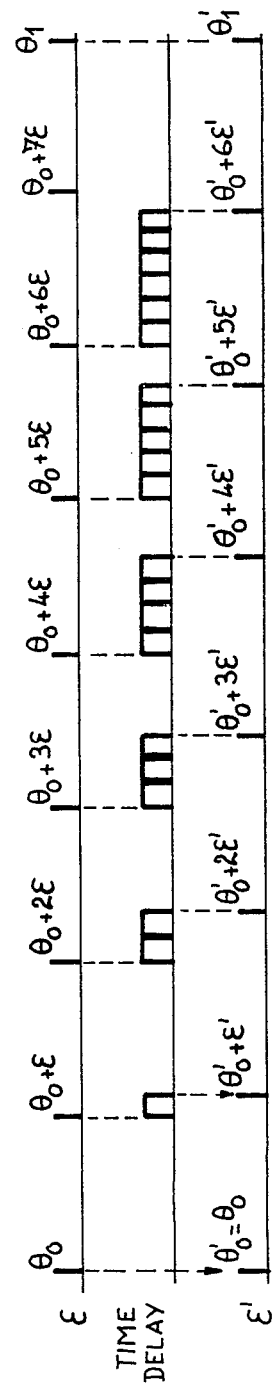
FIG_3-b

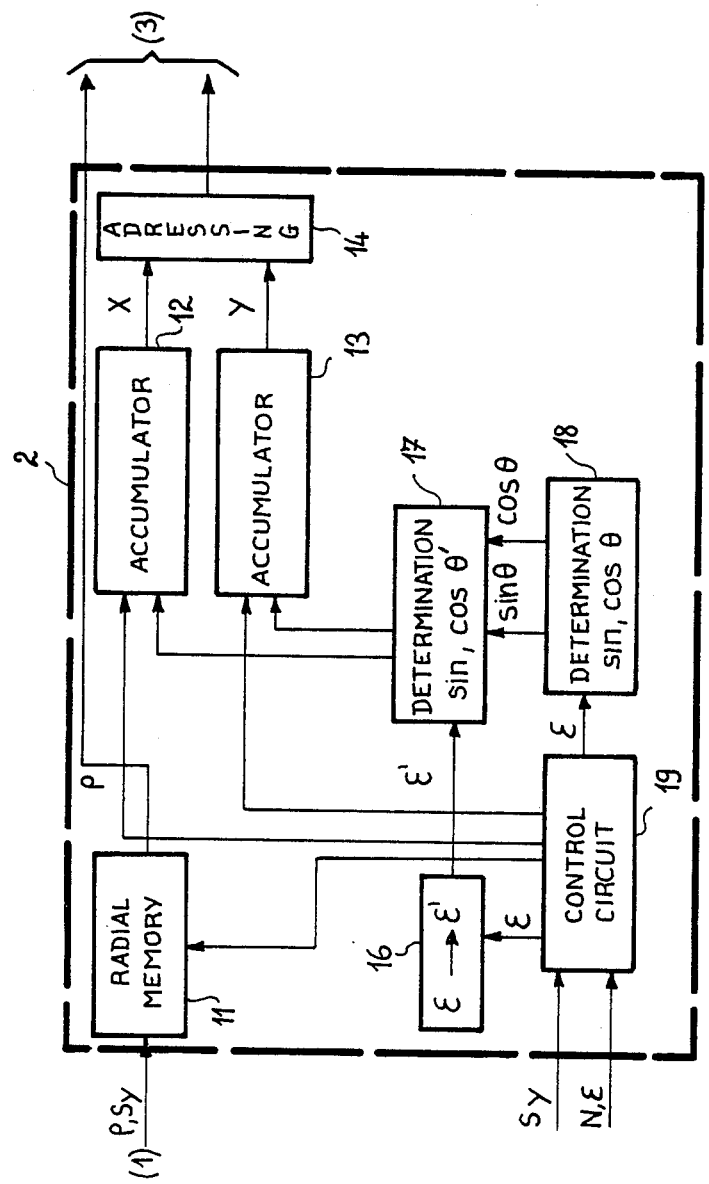

METHOD AND A DEVICE FOR EXTENDING THE RANGE OF RADAR RECURRENCE FREQUENCIES ACCEPTABLE BY A DIGITAL IMAGE CONVERTER

BACKGROUND OF THE INVENTION

1. Field of the Invention

The present invention relates to a digital image converter and is particularly directed to a method for extending the range of radar recurrence frequencies which can be accepted by the converter, as well as means for carrying out said method.

2. Description of the Prior Art

The essential function of a digital image converter (or DIC) is conversion of an image produced in polar coordinates and having relatively slow refresh rate to a luminous television-type image permitting utilization in an illuminated environment. This slow-refresh rate image is usually a radar image but can also be derived from a sonar, an infrared sensor or an echographic system to be displayed on a screen which operates in the television mode.

In the case of radar, a conventional DIC usually comprises the following elements shown in FIG. 1.

A television display 5 on which radar data are displayed.

A radar interface circuit 1 which receives the video signals delivered by the radar. These video signals are constituted by a synchronizing signal ($S_y$) indicating that a pulse is emitted by the radar and by the video output ($p$) properly constituted by all the responses (echoes) to this pulse. This interface circuit is intended in particular to convert the incident video signal (analog signal) into a digital signal and to process the video signal, the processing details being different depending on the type of radar.

A device 2 for conversion of coordinates which receives the video signals delivered by the circuit 1. The radar data is delivered in polar coordinates and must be written on the television screen in cartesian coordinates. To this end, the device 2 also receives signals which are representative of the rotation of the radar antenna. The function of these rotation signals is to indicate at any moment the angular position of the radar beam (radar antenna) as this latter rotates in a uniform manner with respect to a reference direction which is usually north. The rotation signals consist of a north signal (N) which is a pulse delivered each time the radar beam passes through north and of a signal representing an angle increment ($\epsilon$) and indicating that the beam has rotated through $1/n^{th}$ of a revolution with respect to the preceding increment if n increments correspond to 360°;

a memory 3 designated as an image memory and having a capacity adapted to the television standard employed i.e. must have a number of storage locations corresponding to the number of points (or pixels) of the image displayed on the television screen. Furthermore, the luminance of each image pixel is coded by means of a predetermined number of bits such as, for example, three bits permitting eight levels of luminosity for each pixel. Reading towards the television display and writing of the radar information delivered by the circuit 2 are asynchronous: the reading operation has priority and writing is stopped during a reading step.

Read-out circuits 4 for generating television synchronizing signals, for reading one or a number of memory locations and for digital-to-analog conversion of the read data in order to generate the television video signal for the display 5.

A persistence circuit 6 for producing a persistence effect for stored digital data in which no modification exists due to aging. This persistence effect is comparable with the effect produced on a persistence tube in which the brightness of a pixel begins to decay as soon as it is written.

In a system of this type, the process of writing in memory is as follows: the video output is constituted by the responses (echoes) to a pulse emitted by the radar and is produced at the frequency of repetition of transmitted pulses, usually designated by the acronym PRF (Pulse Repetition Frequency). It should be noted that the PRF is determined by the range of the radar. The radar range is the maximum distance at which an echo can be recorded, thus determining the time taken by the pulse to travel to the target and return to the radar (round-trip travel time) and consequently a repetition period or frequency. The video data delivered at the PRF will hereinafter be designated as recurrences. It should also be mentioned that the angle increments $\epsilon$ are usually delivered by the antenna coder in an asynchronous manner with respect to the recurrences. The angle $\theta$ designates the resultant angle between the radar beam at a given instant and the reference direction (north). The video information assigned to each of the n directions $\theta$ of the beam will hereinafter be designated as "radial". When the radar system delivers n angle increments, it is usually desired to display n "radicals". It is accordingly necessary to assign the different recurrences to different radials, that is one recurrence or a number of recurrences to each "radial". The different points or pixels of each radial are then written in the image memory at addresses computed in cartesian coordinates.

However, since the periodicity of the angle increments $\epsilon$ is given by the antenna and the PRF is determined separately by the range of the radar, it appears that, in some instances, these values may be such as to give rise to one of the following unfavourable configurations:

Either the frequency of the increments $\epsilon$ is too low with respect to the PRF. Among the recurrences received at the PRF, there are in that case recurrences which do not correspond to any value of $\theta$. Accordingly, they are either not written in memory and lost or else they are grouped together beforehand (in a manner which may not be constant from one radial to the next or from one antenna revolution to the next) and written in memory. The disadvantage which results from this is an error in positioning of echoes. Further, that positioning error tends to vary from one revolution to another which consequently results in disturbed operation of the persistence.

Or the frequency of the increments $\epsilon$ is too high with respect to the PRF. In this case there are values of angle $\theta$ for which no corresponding radar information (recurrence) is available. Accordingly, there is no entry into image memory due to lack of information. This results in the disadvantage of image irregularity caused by lack of a radial from time to time as well as disturbed operation of the persistence.

In order to overcome these drawbacks, it is found necessary in practice to modify the PRF which in turn causes a limitation of the radar image.

SUMMARY OF THE INVENTION

An object of the present invention is a method which makes it possible to overcome these defects and limitations.

To this end, the method of the present invention comprises an additional step of converting the value of the angle increment $\epsilon$ into a value $\epsilon'$ which is a function of the PRF in order to guard against any loss of information, conversion of coordinates and assignment of recurrences being performed in accordance with the converted value $\epsilon'$.

Another object of the invention is to provide means for carrying out this method.

BRIEF DESCRIPTION OF THE DRAWINGS

Other features of the invention will be more apparent upon consideration of the following description and accompanying drawings, wherein:

FIG. 1, shows block diagram of a digital image converter (DIC) described above.

FIG. 2 shows a partial diagram of a DIC in accordance with the invention.

FIGS. 3a and 3b show two diagrams relating to the method in accordance with present invention.

FIG. 4 is a partial diagram of another embodiment of a DIC according to the invention.

In these different figures, the same references refer to the same elements.

DESCRIPTION OF THE PREFERRED EMBODIMENTS

In FIG. 2, there are shown video signals ($\rho$, $S_y$) received by the device 2 for conversion of coordinates and, more precisely, by a memory 11, called radial memory, having the function of storing the recurrences ($\rho$) as they arrive. The memory 11 can contain separately either one or a number of recurrences.

At the same time, circuit 19 for controlling the coordinate conversion device 2 receives the rotation data from the radar antenna coder. These data consist of the angle increment $\epsilon$ for determining the angle $\theta$ between north reference and the antenna as well as the synchronizing signal $S_y$. By way of example, the circuit 19 is constructed as a microprocessor. The increment $\epsilon$ is then transmitted to means 16 for conversion of the periodicity of $\epsilon$ into a periodicity $\epsilon'$ in accordance with a procedure which will be described below. The pulses having a periodicity $\epsilon'$ are transmitted to means 17 for determining the value of the trigonometric functions (sine and cosine, for example) of the angle $\theta'$ corresponding to $\epsilon'$. The procedure involved in determining the trigonometric functions of the angle $\theta'$ is also described hereinafter.

The values of sin $\theta'$ and cos $\theta'$ are addressed respectively to two accumulators 12 and 13 which also receive from the control circuit 19 the radar coordinates ($X_o$, $Y_o$) and a control signal for initializing the accumulation process. It is recalled that an accumulator is constituted by an adder surrounded by an input register and an output register, the output of this latter being also directed to the adder. The value to be accumulated (sin $\theta'$ or cos $\theta'$) is loaded into the input register and accumulation is initiated by the synchronizing signal $S_y$ via the circuit 19. At each stage of the accumulation process, with respect to a given value of $\theta'$ and therefore with respect to a given radial, the accumulators deliver respectively the cartesian coordinates $X_i$, $Y_i$ with, in the case of sine and cosine accumulations for example:

$$X_i = X_{i-1} + \sin \theta'$$

$$Y_i = Y_{i-1} + \cos \theta'$$

The coordinates $X_i$ and $Y_i$ are directed to a device 14 for addressing the image memory 3 which receives in synchronism (synchronizing signal $S_y$) the quantity $\rho$ to be stored in memory 3, the radial memory 11 being also controlled by the circuit 19.

As stated earlier, the signals corresponding to the angle increment $\epsilon$ are replaced by the signals $\epsilon'$, the periodicity of which is different from that of the signals $\epsilon$ and matched with the PRF, thus guarding against disturbances in the pattern of the radar image or in its persistence. The frequency of the signals $\epsilon'$ is determined as indicated hereinafter so as to be as close as possible to the PRF or to a submultiple of PRF in certain cases.

Particularly in order to maintain maximum resolution of the image and to avoid any discontinuity at the level of the reference direction (north direction), the frequency of the signals $\epsilon$ is chosen so as to ensure that one signal $\epsilon'$ out of n signals $\epsilon$ coincides with a signal $\epsilon$, n being a divisor of the total number N of signals $\epsilon$ in respect of a rotation of the radar beam through an angle of 360°. Furthermore, ($n-2$) signals $\epsilon'$ equally distributed within the time interval are generated between two such coincidences.

Generation of $\epsilon'$ from $\epsilon$ (block 16 in FIG. 2) is performed by means of a time-delay circuit (such as a monostable multivibrator, for example) which delays each signal $\epsilon$ by one or a number of predetermined time intervals ($\Delta$).

FIG. 3a represents one application of the foregoing for n=4.

The first line of this figure represents the time sequence of the pulses $\epsilon$. The first and fifth pulses correspond to angles $\theta_0$ and $\theta_1$, each with respect to north, at which there is a coincidence with pulse $\epsilon'$. The time sequence of the pulses $\epsilon'$ is shown on the third line. Three pulses $\epsilon$ corresponding to angles denoted $\theta_o + \epsilon$, $\theta_o + 2\epsilon$ and $\theta_o + 3\epsilon$ are received between angles $\theta_o$ and $\theta_1$.

The second line represents the time-delay imposed on predetermined pulses $\epsilon$ by the time-delay circuit 16 in order to generate the pulses $\epsilon'$ controlled by circuit 19. In case of the angle $\theta_o$, the pulses $\epsilon$ and $\epsilon'$ coincide and the time-delay circuit does not come into operation. The increment $\epsilon$ which follows ($\theta_o + \epsilon$) initiates operation of the time-delay circuit which delivers a signal constituting the second pulse $\epsilon'$ after a pre-defined time-delay $\Delta$. The corresponding angle is designated as $\theta'_o + \epsilon'$. The increment $\epsilon$ which follows ($\theta_o + 2\epsilon$) triggers the time-delay circuit which delivers a double time-delay ($2\Delta$) in order to supply the third pulse $\epsilon'$ ($\theta'_0 + 2\epsilon'$). The increment $\epsilon$ which follows ($\theta_o + 3\epsilon$) does not give rise to any pulse $\epsilon'$. Finally, the increment $\epsilon$ which follows ($\theta_1$) again coincides with $\epsilon'$.

It appears that, when n=4 pulses $\epsilon$, there are generated $n-1=3$ pulses $\epsilon'$ with coincidence of the pulses $\epsilon$ and $\epsilon'$ once every n=4 pulses $\epsilon$.

FIG. 3b shows another example of generation of pulses $\epsilon'$, with n=8 pulses $\epsilon$ and therefore $n-1=7$ pulses $\epsilon'$, with the same notations.

When (n−1) pulses ε′ are generated with respect to n pulses ε, the duration Δ of the basic time-delay imposed on the pulse ε in order to form the pulse ε′ is Δ=ε/(n−1), where ε designates the time interval between two pulses ε.

The number k of elementary time-delays Δ imposed on a pulse ε is given by the sequence number of the pulses ε received from the angle ($\theta_0$) at which the pulses ε and ε′ are in coincidence: $\theta_0$+kε produces $\theta_0$+kε′ after a time-delay equal to kΔ.

A point worthy of note is that, for using the same circuit 16 to generate the pulses ε′ both in the embodiments shown in FIG. 3a and FIG. 3b, it is only necessary to divide the elementary time-delay Δ by two in order to produce Δ′=Δ/2 and to apply 2Δ′ instead of Δ in the case of FIG. 3a.

Moreover, it is clearly possible to employ more complex laws reflecting correspondence between ε and ε′ such as (n−p) pulses ε′, corresponding to n pulses ε, where p is any whole number. However, processing of the pulses ε′ thus obtained is also more complex in such a case.

In accordance with the invention, the incident recurrences are therefore assigned to the angles θ′ obtained from the pulses ε′ and recorded on the image at the angles θ′ considered. The result thereby achieved is that the incident information (recurrences) is more effectively utilized. In addition, the radials are recorded in the same positions from one antenna revolution to the next (repetitively), thus avoiding problems of persistence. Finally, the radials can be uniformly spaced (equal distribution) without any radial skipping caused by a lack of recurrence, thus maintaining uniformity of the image.

In one embodiment, in order to obtain the functions sin θ′ and cos θ′ which are necessary for conversion of coordinates, it is possible to store in a read-only memory (17), of the PROM type for example, the value of the trigonometric functions (sine and cosine) which it will be possible to address by means of the successive pulses ε′. This solution is simple but suffers from the disadvantage of being specific to the frequency chosen for the pulses ε′.

There is shown in FIG. 4 an alternative embodiment of the conversion device 2, in which it is possible to change the frequency of the increments ε′.

This alternative embodiment comprises a memory 18 in which a series of values of the trigonometric functions such as for example which correspond to the angles θ is stored. The trigonometric functions relating to the angles θ are accordingly deduced from those of the angles θ by the circuit 17, for example by linear interpolation in accordance with the following expressions:

$$\sin\theta' = \sin\theta + k \cdot \frac{\sin(\theta + 1) - \sin\theta}{n - 1}$$

$$\cos\theta' = \cos\theta + k \cdot \frac{\cos(\theta + 1) - \cos\theta}{n - 1}$$

where n is defined as before and k varies from 0 to n−2.

In another alternative embodiment, the interpolation calculation performed by the circuit 17 can be carried out by the control block 19 when this latter is formed by means of a microprocessor. In this case the block 17 of FIG. 4 is dispensed with, the data and control means which terminate at this block being transferred to the block 19.

If the means 16 and 17 form an assembly which performs the combined functions of reception of increments ε, activation of the time-delay circuit and computation of linear interpolation, it should be noted that the time available for the step of computation of interpolation (this operation being initiated upon arrival of the increment ε′) decreases as the value of k becomes higher. This time interval which elapses between a pulse ε′ and the following pulse ε is equal to $$(n - 1 - k) \cdot \frac{\epsilon}{n - 1}.$$

It is therefore necessary either to limit the value of n and of k or, if the duration of the linear interpolation number k is higher than $$(n - 1 - k) \cdot \frac{\epsilon}{n - 1},$$

to make provision in the interpolation computation for the possible arrival of a pulse ε as well as means for re-activating the time-delay circuit if necessary.

In another embodiment, the interpolation formula is modified so that the time necessary for this calculation is a decreasing function of k as in the case of the time available to perform calculation. This does not dispense with the need to take into account in all cases the arrival of a pulse ε during interpolation but has the effect of broadening the margin of operation of the system. There is accordingly obtained:

$$\sin\theta' = \sin(\theta + 1) - (n - 1 - k) \cdot \frac{\sin(\theta + 1) - \sin\theta}{n - 1}$$

$$\cos\theta' = \cos(\theta + 1) - (n - 1 - k) \cdot \frac{\cos(\theta + 1) - \cos\theta}{n - 1}$$

where the initial value corresponds to θ+1 (and no longer to θ) from which is deducted a quantity (and no longer an addition). Thus the number of iterative computations becomes equal to (n−1−k), which is a decreasing function of k, and is no longer equal to k.

What is claimed is:

1. A method of improving a digital image converter to extend a frequency range of acceptable radar recurrence frequencies,
the digital image converter receiving radar type video data generated in accordance with a predetermined pulse repetition frequency (PRF) established by a radar transmitter and data representing radar antenna angular position (θ) with reference to a predetermined reference direction (N) in successive first angular increments (ε), the digital image converter converting said angular position data into Cartesian coordinates for addressing an image memory to store said radar video data therein, wherein said method comprises the steps of:
receiving said successive first angular increments (ε),
converting said successive first angular increments with a first repetition frequency into second successive angular increments (ε′) with a different repetition frequency which is either approximately equal to said pulse repetition frequency of the radar transmitter or approximately equal to a sub-multiple of said pulse repetition frequency.

2. A method according to claim 1, wherein said different repetition frequency is selected to be approximately equal to the pulse repetition frequency.

3. A method according to claim 1, wherein said different repetition frequency is selected to be approximately equal to a submultiple of the pulse repetition frequency.

4. A method according to claim 1, which includes a step of generating addressing signals in response to said second successive angular increments ($\epsilon'$).

5. A method according to claim 1, wherein a delay between successive second angular increments ($\epsilon'$) is selected so that n-p second angular increments ($\epsilon'$) exist with respect to n first angular increments ($\epsilon$), wherein n and p are positive integers, with time coincidence of said first and second angular increments occurring at least once per n first angular increments ($\epsilon$), wherein n is a divisor of the total number (N) of first angular increment ($\epsilon$) signals corresponding to a 360° radar beam rotation.

6. A method according to claim 5, wherein the value of p is equal to 1.

7. A method according to claim 1 wherein said converting step includes imposing a time-delay on said successive first angular increments ($\epsilon$).

8. An improved digital image converter for converting radar type video data at a predetermined pulse repetition frequency (PRF) established by a radar transmitter to Cartesian form with an extended frequency range of acceptable radar recurrence frequencies comprising:
first means responsive to said radar type video data for storing said radar type video data,
second means responsive to antenna position data representing radar antenna angular position ($\Theta$) with reference to a predetermined reference direction (N) in successive first angular increments ($\epsilon$) with a first repetition frequency for converting said antenna position data into second successive angular increments ($\epsilon'$) with a different repetition frequency which is either approximately equal to said pulse repetition frequency of said radar transmitter or a submultiple of said pulse repetition frequency,
image memory means for storing said radar type video data and third means for generating addressing signals for said image memory means in response to said second successive angular increments ($\epsilon'$) of said second means.

9. A device according to claim 8 wherein said second means further comprises time-delay means for receiving said successive first angular increments ($\epsilon$) and converting said successive first angular increments ($\epsilon$) into said second successive angular increments ($\epsilon'$) by subjecting said first successive angular increments ($\epsilon$) to a time delay.

10. A device according to claim 9, wherein said time-delay for a given one of said second successive angular increments ($\epsilon'$) corresponds to k$\Delta$, where k is a sequence of a first angular increment pulse ($\epsilon$) received from an instant of coincidence of the first and second angular increments, k being chosen in a range from 0 to n−2, and $\Delta$ corresponds to $\Delta = \epsilon/(n-1)$ where $\epsilon$ is the time interval between two of the first angular increments and n is an integer selected as a factor of N, where N is the total quantity of first angular increments in 360°.

11. A device according to claim 8, wherein said second means further comprises a memory for storing values of trigonometric functions of angles ($\theta'$) corresponding to each of said second successive angular increments ($\epsilon'$).

12. A device according to claim 8, wherein said second means comprises a memory for storing values of trigonometric functions of angles ($\Theta$) corresponding to each of first angular increments ($\epsilon$) and means for determining, by interpolation, trigonometric functions of angles ($\Theta'$) corresponding to second angular increments ($\epsilon'$).

13. A device according to claim 12, wherein interpolation is obtained according to the following formulae:

$$\sin \Theta' = \sin \Theta + k \cdot [\sin (\Theta + 1) - \sin \Theta]/(n-1)$$

$$\cos \Theta' = \cos \Theta + k \cdot [\cos (\Theta + 1) - \cos \Theta]/(n-1)$$

where $\Theta$ is an angle corresponding to a first angular increment ($\epsilon$) and $\Theta'$ is an angle corresponding to a second angular increment ($\epsilon'$).

14. A device according to claim 12, wherein interpolation is obtained according to the following formulae:

$$\sin \Theta' = \sin (\Theta + 1) - (n-1-k) \cdot [\sin (\Theta + 1) - \sin \Theta]/(n-1)$$

$$\cos \Theta' = \cos (\Theta + 1) - (n-1-k) \cdot [\cos (\Theta + 1) - \cos \Theta]/(n-1)$$

where $\Theta$ is an angle corresponding to a first angular increment ($\epsilon$) and $\Theta'$ is an angle corresponding to a second angular increment ($\epsilon'$).

* * * * *